United States Patent [19]

Miklich

[11] Patent Number: 5,156,499

[45] Date of Patent: Oct. 20, 1992

[54] ROLLER INJECTION AIR LOCK

[76] Inventor: Henry A. Miklich, 1921 Highway 12 South, Ashland City, Tenn. 37015

[21] Appl. No.: 671,372

[22] Filed: Mar. 19, 1991

[51] Int. Cl.$^5$ .................. B65G 53/40; B65G 53/52; B65G 53/66
[52] U.S. Cl. ...................................... 406/70; 406/127
[58] Field of Search .................... 406/70, 128, 127

[56] References Cited

U.S. PATENT DOCUMENTS

| 1,065,924 | 7/1913 | Dixon | 406/70 |
| 3,402,684 | 9/1968 | Gradischer et al. | 406/70 X |
| 4,453,866 | 6/1984 | Ryan | 406/70 |

FOREIGN PATENT DOCUMENTS 501596 2/1939 United Kingdom .................. 406/70

Primary Examiner—Russell D. Stormer
Assistant Examiner—James M. Kannofsky
Attorney, Agent, or Firm—Casey F. Wilson

[57] ABSTRACT

An air lock for injecting a fibrous or granular material, such as insulation, into an airstream. The air lock has two counter-rotating, generally cylindrical rollers in facing contact with each other along their edges, made of a resilient material such as a closed cell foam. The rollers are also in facing contact with the outside of a tube or cylinder through which the airstream flows. The insulation is positioned on top of the rollers, and the rollers feed the insulation between them and into the airstream. The contact between the rollers and between the rollers and the injection tube create the air lock between the airstream and the atmosphere. The invention can also be used in a vacuum machine, particularly suited for vacuuming and collecting fibrous or granular materials.

4 Claims, 4 Drawing Sheets

ROLLER INJECTION AIR LOCK

BACKGROUND OF THE INVENTION

This invention relates to the field of preparing, transporting and conveying fibrous, granular and other materials. The invention is described as it can be applied to the conveyance and application of fibrous insulation, such as acoustical or fireproofing insulation; however, the invention can be used in and with a large number of applications and materials. Some of the applications include pneumatic transport, conveyance, application and vacuum. Some of the material with which the invention can be used are grains, beads, shredded plastic, dust, fiberglass and other fibrous materials.

Fibrous insulation is typically applied to a desired surface by mechanically separating a quantity of the insulation from a bulk supply of the material, injecting the separated insulation into an airstream and, along with the airstream, through one or more tubes, pipes or conduits to the point of application, where it is sprayed or otherwise placed on the surface. The insulation must be injected into the airstream through an air lock to prevent the diversion of the airstream from the desired path and into the supply of insulation. Heretofore a paddlewheel type air lock typically has been used to inject the insulation into the airstream. The chambers of a paddlewheel air lock must be relatively large to allow the light insulation to fall into a chamber as it rotates. Additionally, a system using a paddlewheel air lock tends to inject the insulation into the airstream in a pulsed fashion, particularly at low revolutions.

SUMMARY OF THE INVENTION

The invention is a new method and apparatus for injecting the insulation into the airstream. The invention uses an air lock made of two counter-rotating, generally cylindrical rollers in facing contact with each other along their edges. The rollers are made of a resilient material, preferably a closed cell foam. The rollers are also in facing contact with the outside of the tube or cylinder through which the airstream flows. The insulation is positioned on top of the rollers, and the rollers feed the insulation between them and into the airstream. The contact between the rollers and between the rollers and the injection tube create an air lock between the airstream and the atmosphere.

The insulation is conditioned for application primarily by its injection into the airstream rather than the mechanical means used by conventional machines. This type of conditioning better preserves the integrity of the insulation fibers, making the applied insulation thermally more efficient. Further, a machine utilizing the invention uses less energy than does a conventional machine. It also is smaller and lighter than conventional machines, reducing the amount of energy required to transport the machine.

The rollers are relatively unaffected by the introduction of foreign objects between them. If a portion of a roller is removed or damaged by a foreign object or otherwise, the air lock is partially self healing. The insulation being injected by the air lock tends to fill the hole, sufficiently maintaining the seal as that portion of the roller passes the other roller.

The invention can also be used in a vacuum machine, particularly suited for vacuuming and collecting materials of the sort described above. One possible use of such a vacuum system is in the reclamation of hazardous materials such as asbestos.

DESCRIPTION OF THE PREFERRED EMBODIMENT

Figure 1:
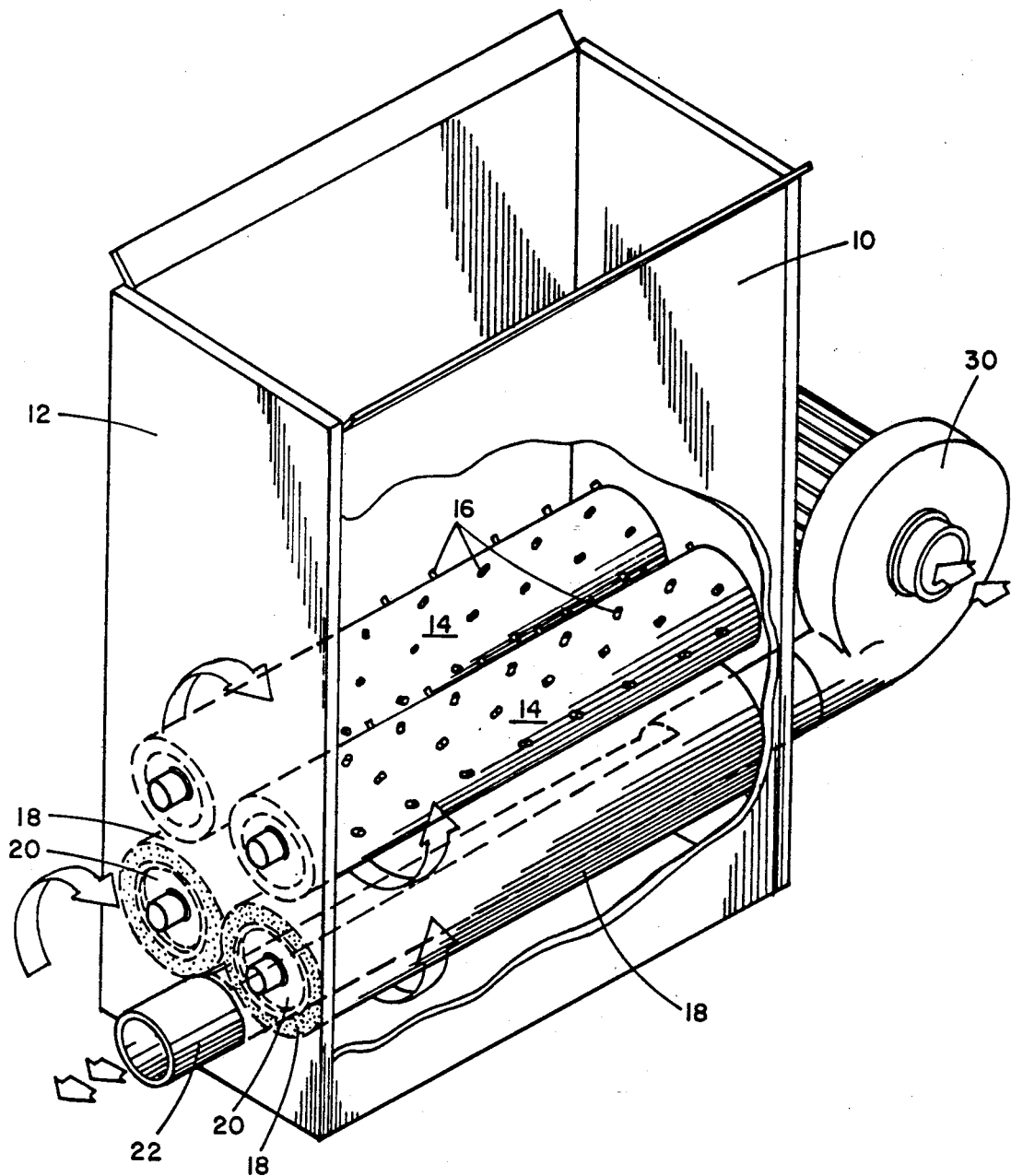
FIG. 1 is a perspective view of an insulation blowing machine made with the invention.
Figure 2:
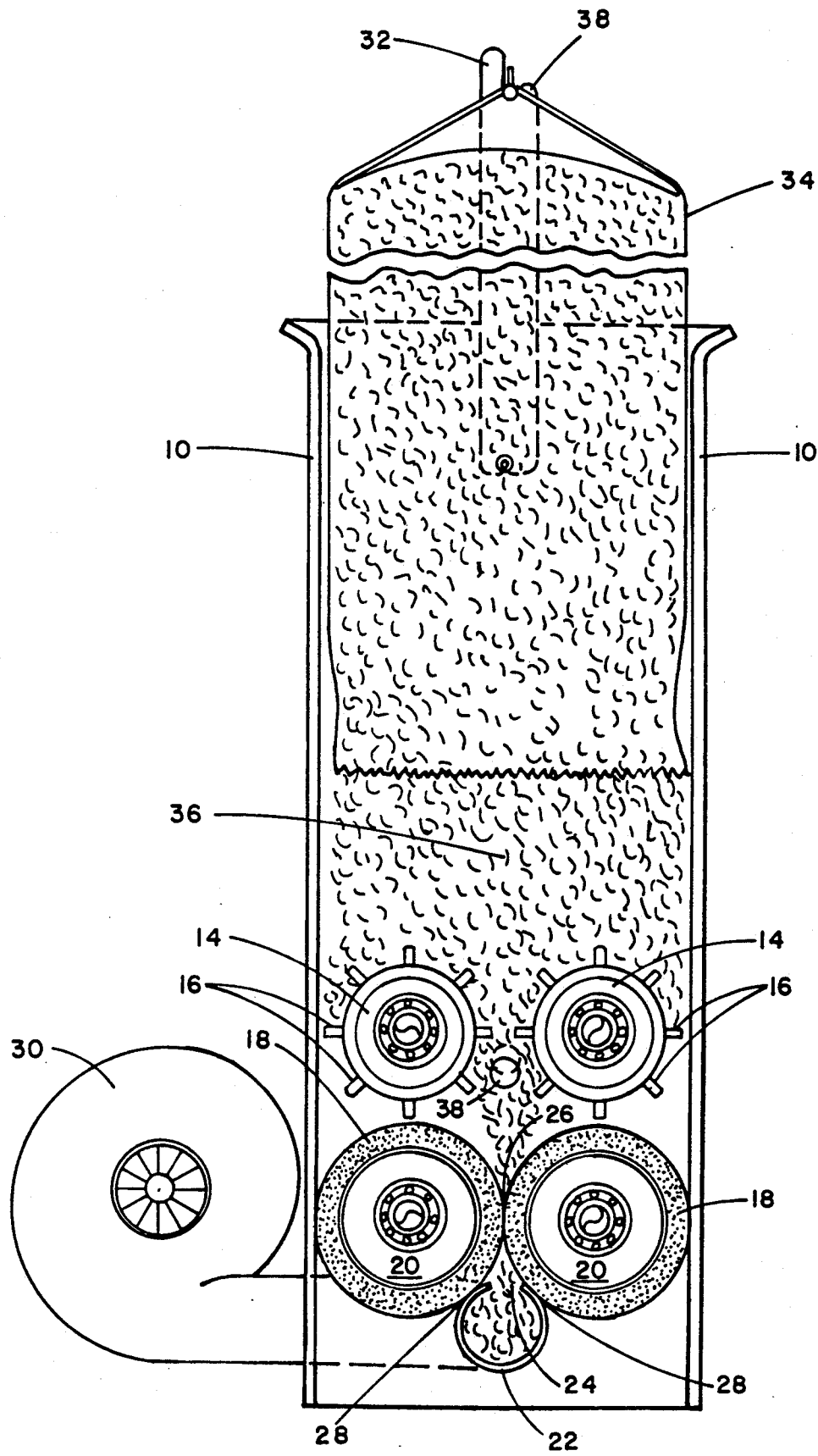
FIG. 2 is a cross-section of an insulation blowing machine made with the invention.

Referring with particularity to FIGS. 1 and 2, the invention will be described in its application to the pneumatic conveyance of insulation. The insulation blowing machine has two side walls 10 and two end walls 12. Two counter-rotating metering rollers 14 are positioned parallel to the side walls 10. Each metering roller 14 has pins 16 projecting from its outer surface. As the metering rollers 14 rotate toward each other as shown in FIG. 2 the pins 16 pull an amount of the insulation away from the bulk of insulation 36 and down between the metering rollers 14. The preferred material from which to make the metering rollers 14 is PVC. The size, design and placement of the pins 16 will vary with the type of material for which the machine is used. In particular, interchangeable metering rollers 14 of differing diameters and having pins 16 of different heights, diameters and placements may be used.

Below and substantially parallel to the metering rollers 14 are two counter-rotating injection rollers 18. The injection rollers 18 should be made from a material which is pliable and resilient. The preferred material is a high density, closed cell foam. Each injection roller 18 is internally supported by a rigid shaft 20, journalled at both ends. The injection roller 18 is secured to the the shaft 20 by friction or by a suitable adhesive. The injection rollers 18 are in facing contact with each other along their entire lengths along the line of contact 26 shown in FIG. 2. The ends of the injection rollers 18 should be in facing contact with the end walls 14. The preferred method of driving the metering rollers 14 and injection rollers 18 is to drive one metering roller 14 with an electric motor and drive the others with a standard gear or serpentine chain drive. It is also preferred that the speed of rotation may be controlled as needed by the operator.

Beneath and parallel to the injection rollers 18 is the injection tube 22. An injection slot 24 is cut into the top of the injection tube 22 for substantially the length of the injection rollers 18. The outside of the injection tube 22 is in facing contact with both injection rollers 18 on either side of the injection slot 24 along the lines of contact 28 shown in FIG. 2. A blower 30 blows a stream of air through the injection tube 22. The injection rollers 18 form an air lock between the airstream in the injection tube 22 and the outside atmosphere.

The insulation is placed within the blowing machine. One possible method of insulation insertion is to suspend a bag 34 of insulation on a rod 38 from two bag supports 32, extending upward from both end walls 12.

In operation, the blower 30 is turned on, creating an airstream through the injection tube 22. The insulation 36 is placed within the machine. As the metering rollers 14 rotate, the pins 16 pull portions of insulation from the mass of insulation and down between the metering rollers 14. The fiber length of the insulation which passes between the metering rollers 14 is controlled by the position of the density control rod 38. The fiber length determines the density of the final product. The density control rod 38 can be raised and lowered by the operator in any suitable manner, for example, with a cammed control. The closer the density control rod 38 is to the metering rollers 14, the shorter the fiber length of the material passed through and the more dense the final product. The insulation pulled between the metering rollers 14 falls onto the injection rollers 18. The insulation is pinched between the injection rollers 18 and injected through the injection slot 24 into the injection tube 22.

Figure 3:
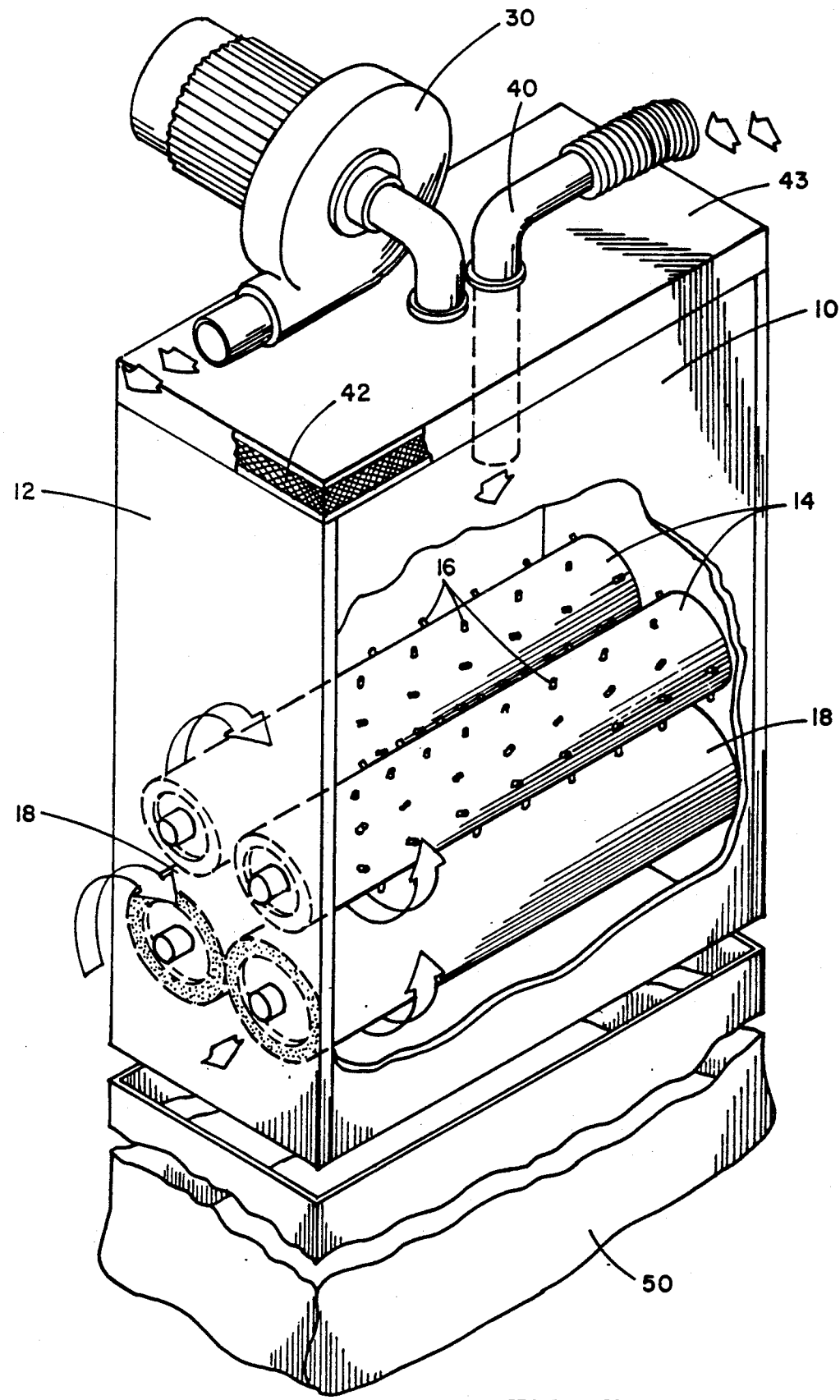
FIG. 3 is a perspective view of a vacuum system made with the invention.
Figure 4:
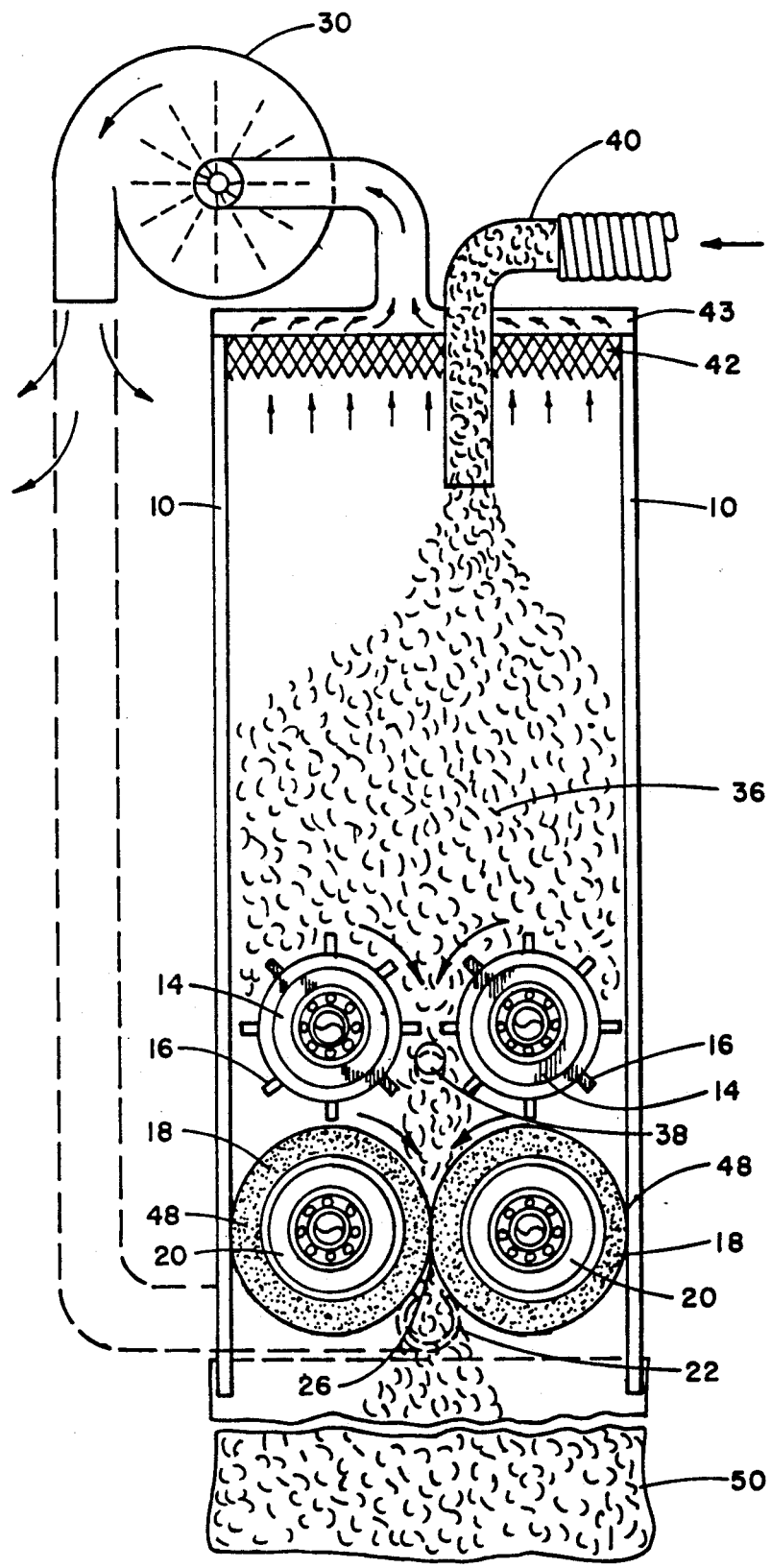
FIG. 4 is a cross-section of a vacuum system made with the invention.

The air lock of the invention may be used in a similar manner with a vacuum system. Referring with particularity to FIGS. 3 and 4, the invention will be described as used in such a system.

The side and end walls 10 and 12, the metering rollers 14, the injection rollers 18 and density control rod 38 are as described above. It is important that the injection rollers 18 be in facing contact with the side walls 10 along lines 48, as shown in FIG. 4, to maintain the air seal. A top 43 is added to the vacuum system. A blower 30 pulls air from the interior of the system through a filter 42. The filter 42 may be of any suitable type, such as a HEPPA filter or a washable, open cell foam filter. An inlet 40 conveys the vacuumed air and material into the interior of the system. The larger portions of the material fall to the top of the metering rollers 14 and the dirty air is through the filter 42 by the blower 30. The air lock of the invention is used to remove the material from the system without interrupting the vacuuming procedure. The metering rollers 14 and the injection rollers 18 counter-rotate as shown in FIGS. 3 and 4, bringing the material between the injection rollers 18 as described above. The material falls into the collection bag 50 for transport, disposal, etc.

It is possible to use the air lock in a system which both vacuums and conveys the material. The outlet of the blower 30 which removes the dirty air through the filter 42 is connected to the injection tube 22 described above. This arrangement is shown using dashed lines in FIG. 4. In this manner material can be removed from one place and pneumatically conveyed to another.

The metering rollers 14 and the density control rod 38 are not needed in all applications of the invention. Some materials, such as small beads and grains, can be conveyed or vacuumed without the metering rollers 14 and density control rod 38. These materials will be pinched between the injection rollers 18 without preparation. Other materials, such as many fibrous insulations, require preconditioning. These materials tend to bridge or stall over the injection rollers 18 alone. The metering rollers 14 pull a portion of the material onto the injection rollers 18. The density control rod 38 controls the density of the material.

It will be seen that the embodiments disclosed above are only illustrative of the invention. Many variations and other applications and uses of the invention will be apparent, and these applications are within the scope and spirit of the invention.

I claim:

1. A device for conditioning, metering and injecting into an airstream fibrous material comprising:
    (a) a hopper containing an amount of said material;
    (b) a pair of counter-rotating first rollers beneath said hopper, each of said first rollers having a plurality of projections extending radially therefrom;
    (c) a pair of counter-rotating second rollers beneath said first rollers, said second rollers being in facing contact with each other along a line;
    (d) a metering rod above said line and a distance below said first rollers; and
    (e) an injection tube beneath and in facing contact with said second rollers, said injection tube conveying said airstream, said injection tube having a longitudinal opening in its upper surface beneath said line, said second rollers and injection tube forming an air lock between said airstream and an area above said second rollers.

2. The device of claim 1 wherein the speeds of rotation of said first rollers and said second rollers are adjustable.

3. The device of claim 1 further comprising a means for varying said distance between said first rollers and said metering rod.

4. The device of claim 3 wherein said adjustment means is a cam permitting adjustment of said distance between said first rollers and said metering rod.

* * * * *